United States Patent Office
2,792,379
Patented May 14, 1957

2,792,379

REACTION PRODUCTS OF CARBOXYLATED PHENOL-ALDEHYDE RESINS AND AMINE-MODIFIED PHENOL-ALDEHYDE RESINS

Melvin De Groote, University City, Mo., assignor to Petrolite Corporation, Wilmington, Del., a corporation of Delaware No Drawing. Application December 3, 1953, Serial No. 396,080

24 Claims. (Cl. 260—45)

The present invention is concerned with processes involving reactions between certain amine-modified phenol-aldehyde resins and certain carboxylated resins. Furthermore, it is concerned with the products so obtained and their uses in various arts.

U. S. Patent No. 2,571,118, dated October 16, 1951, to De Groote and Keiser, describes a fusible, carboxyl-containing xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted at least one difunction monohydric hydrocarbon-substituted phenol radical per molecule; said resin being formed in the substantial absence of phenols of functionality greater than two, and said phenol being of the formula

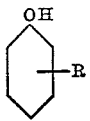

in which R is a hydrocarbon radical having at least 4 and not more than 14 carbon atoms and substituted in one of the positions ortho and para.

More specifically, the present invention is concerned with the reaction between said carboxylated resins above described and certain amine-modified thermoplastic phenol-aldehyde resins; such amine-modified resins have been described in my co-pending application, Serial No. 381,980, filed September 23, 1953. A typical claim is as follows:

"The process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydricphenol and an aldehyde having not over 8 carbon atoms and reactive toward said phenol; said resin being formed in the substantial absence of trifunctional phenols; said phenol being of the formula

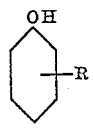

in which R is an aliphatic hydrocarbon radical having at least 4 and not more than 24 carbon atoms and substituted in the 2,4,6 position; (b) a basic secondary amine free from any primary amino radical and having not more than 32 carbon atoms in any group attached to any amino nitrogen radical and reactive towards furfural; and (c) furfural; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible."

The carboxylated phenol-aldehyde resins above described generally contain one or more carboxyl radicals, and generally one or two carboxyl radicals. The amine-modified phenol-aldehyde resins above described invariably have at least two alkanol radicals and may have more. Thus, the two types of reactants readily can form the equivalent of esters and particularly linear polymers dependent on ester linkages.

More specifically then the present invention is concerned with an acylation process involving (A) a carboxylated resin, said carboxylated resin being a fusible, carboxyl-containing xylene-soluble, water-insoluble low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula

in which R is a hydrocarbon radical having at least 4 and not more than 14 carbon atoms and substituted in one of the positions ortho and para; and (B) an amine-modified phenolaldehyde resin, said amine-modified resin being obtained by the process of condensation of (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol forming reactivity; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

in which R is an aliphatic hydrocarbon radical having at least 4 and not more than 24 carbon atoms and substituted in the 2,4,6 position; (b) a basic secondary amine free from any primary amino radical and having not more than 32 carbon atoms in any group attached to any amino nitrogen radical and reactive towards furfural; and (c) furfural; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; said acylation reaction being conducted at a temperature sufficiently high to eliminate water of formation and below the pyrolytic point of the reactants and products of reaction.

Furthermore, the present invention is concerned with the products obtained by the acylation (esterification) process described immediately preceding.

For purpose of convenience what is said hereinafter will be divided into seven parts:

Part 1 is concerned with a description of the peculiar condensates obtained when furfural is employed in comparison with some simple aldehyde, such as formaldehyde;

Part 2 is concerned with the preparation of the carboxylated resins;

Part 3 is concerned with the phenol-aldehyde resin which is subjected to modification by condensation reaction to yield an amine-modified resin;

Part 4 is concerned with appropriate basic secondary amines which may be employed in the preparation of the herein-described amine-modified resins;

Part 5 is concerned with reactions involving the resin, the amine, the furfural to produce specific products or compounds;

Part 6 is concerned with the acylation or esterification reaction involving the carboxylated resins on the one hand and the amine-modified resins on the other hand; and Part 7 is concerned with uses for the products described in Part 6, preceding.

PART 1

As to a description of the peculiar structure of the amine-modified resins obtained by use of furfural, attention is directed to my co-pending application, Serial No. 381,980, filed September 23, 1953, and the following text as far as Part 1 is concerned is substantially the same as it appears therein:

For purpose of illustration it may be simpler to divert momentarily to the products described in the five aforementioned co-pending applications, Serial Nos. 288,742 through and including 288,746, inclusive, filed May 19, 1952, and now abandoned and for sake of simplicity to the first one, i. e., Serial No. 288,742, in which the amine reactant is a nonhydroxylated monoamine. For purpose of simplicity the invention described in said co-pending application, Serial No. 288,742, may be exemplified by an idealized formula, as follows:

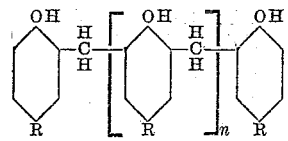

in which R represents a hydrocarbon substituent generally having 4 and not over 18 carbon atoms but most preferably not over 14 carbon atoms, and $n$ generally is a small whole number varying from 1 to 4. In the resin structure it is shown as being derived from formaldehyde although obviously other aldehydes are equally satisfactory. The amine residue in the above structure is derived from a basic amine, and usually a strongly basic amine, and may be indicated thus:

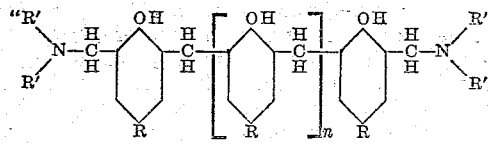

in which R′ represents any appropriate hydrocarbon radical, such as an alkyl, alicyclic, arylalkyl radical, etc., free from hydroxyl radicals. The only limitation is that the radical should not be a negative radical, which considerably reduces the basicity of the amine, such as an aryl radical or an acyl radical. Needless to say, the two occurrences of R′ may jointly represent a single divalent radical instead of two monovalent radicals. This is illustrated by morpholine and piperidine. The introduction of two such amino radicals into a comparatively small resin molecule, for instance, one having 3 to 6 phenolic nuclei as specified, alters the resultant product in a number of ways. In the first place, a basic nitrogen atom, of course, adds a hydrophile effect; in the second place, depending on the size of the radical R′, there may be a counterbalancing hydrophobe effect or one in which the hydrophobe effect more than counterbalances the hydrophile effect of the nitrogen atom. Finally, in such cases where R contains one or more oxygen atoms, another effect is introduced, particularly another hydrophile effect."

Such condensates, i. e., the condensates of Serial No. 288,742, and in fact the instant condensates, are obtained from phenol-aldehyde resins. It is well known that one can readily purchase on the open market, or prepare, fusible, organic solvent-soluble, water-insoluble resin polymers of a composition approximated in an idealized form by the formula

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents a hydrocarbon substituent, generally an alkyl radical having from 4 to 14 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

When in the preparation of certain phenol-aldehyde resins formaldehyde is replaced by furfural precautions must be taken if one is attempting to obtain an organic solvent-soluble resin. The reason is that cross-linking is produced due to the unsaturation of furfural in addition to its usual functionality as an aldehyde. This has been stated briefly as follows:

"Other aldehydes than formaldehyde react readily with phenol, but these resins are not commercially important except the reaction product of phenol with furfural. The condensation products are much darker in color than the resins from formaldehyde. The resins are formed by the condensation of furfural with phenol in alkaline solution. The condensates cure on heating to 350° F. with evolution of heat. This polymerization is believed to be of the vinyl type, involving the double bonds in the furane ring

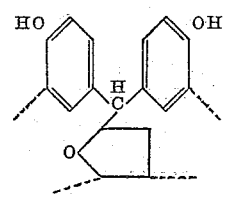

Formaldehyde has been used along with furaldehyde in some instances." (See "Synthetic Resins and Rubbers," Powers, John Wiley & Sons, Inc., New York, 1943, page 78.)

Thus, it becomes apparent that the oversimplification which has been previously presented in connection with formaldehyde in the following manner:

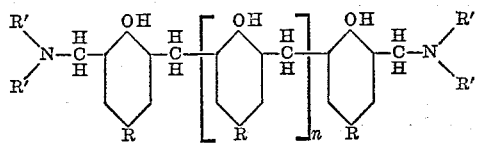

must be rewritten in connection with furfural in the following manner:

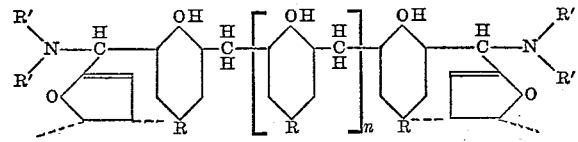

Reverting again to what is said in the five copending applications previously referred to, and particularly to Serial No. 288,742, reference is made to the text which describes other products of reaction which appear in the cogeneric mixture resulting from reaction between the resin, the secondary amine and formaldehyde. The reference is as follows:

"In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

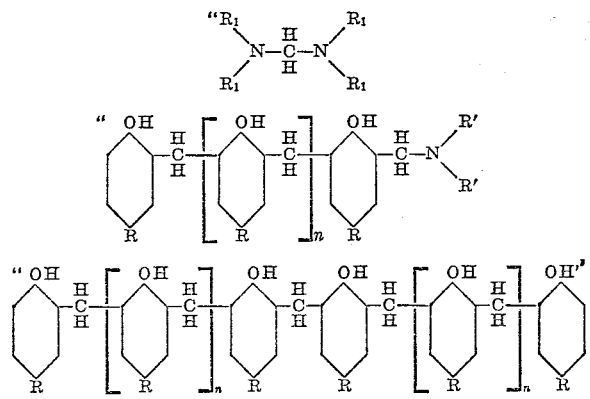

When formaldehyde is replaced by furfural the three previous formulas become as follows:

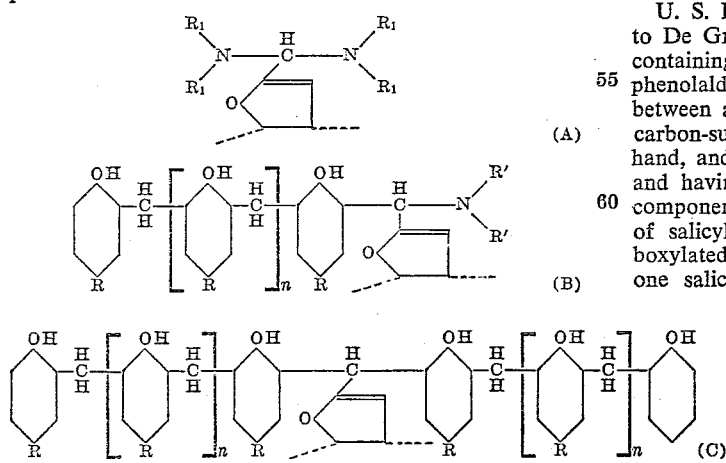

For reasons which are obvious from an examination of the literature concerned with the production of furane resins, and particularly resins in which furfural is involved no attempt has been made to show how any two or more of the same four constituents can dimerize or trimerize. The four constituents in mind are the three that have been noted in the preceding text as to presence in the cogeneric mixture and, more specifically, the primary reactant which has been described previously, thus:

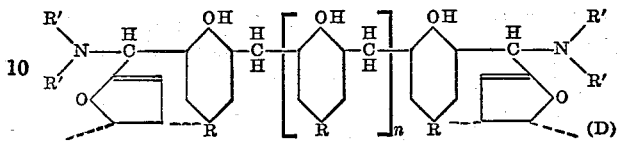

It is quite possible that in the presence of an alkaline catalyst as distinguished from an acid catalyst, polymerization does not go beyond a dimer or a trimer. The types, of course, would be indicated as AA, BB, CC, DD, AB, AC, AD, BC, BD, etc. It is quite possible that at least some trimers are formed. In any event, to the extent that there is present in a reaction mass involving formaldehyde certain products which may be considered byproducts it becomes obvious that these same types of resultants, i. e., the by product type of resultant, becomes part of a larger molecule when furfural is used. Thus it is quite possible that practically all the resultants of reaction involve the original amine and the original resin when furfural is used as the aldehyde, in this type of condensation. This is demonstrated by at least two facts, (a) substituting furfural for formaldehyde in any particular mixture one obtains a resin which is more apt to be solid, in fact, usually is solid rather than being a thick, viscous, tacky liquid, and shows a higher molecular weight by various procedures employed, although such methods are not necessarily completely satisfactory from an analytical standpoint; and (b) the products obtained from furfural can be heated at temperatures higher than those herein described in the preparation of the products, and will not infrequently convert into an insoluble resin. At least in most instances the addition of more furfural with subsequent heating so converts them. Comparable condensates derived from formaldehyde do not convert over in the presence of additional formaldehyde. Furthermore, the composition of the instant products are complicated by the fact that furfural as such might polymerize to a dimer prior to reaction and thus involve a different type of compound than in some mentioned previously.

PART 2

U. S. Patent No. 2,571,118, dated October 16, 1951, to De Groote and Keiser, describes a fusible, carboxyl-containing, xylene-soluble, water-insoluble, low-stage phenolaldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula:

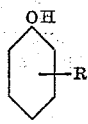

in which R is a hydrocarbon radical having at least 4 and not more than 14 carbon atoms and substituted in one of the positions ortho and para.

The present invention is concerned with the use of such carboxyl-containing resins obtained from a reactant mixture in which 1 to 2 moles of salicylic acid are used in conjunction with 3 to 5 moles of a substituted phenol as described. In most instances the preferred mixture involves a 3:2 or 4:1 molal ratio of substituted phenol to salicylic acid.

Assuming one used 4 moles of amylphenol and one mole of salicylic acid, the resin in its simplest aspect may be represented in an idealized form in the following manner:

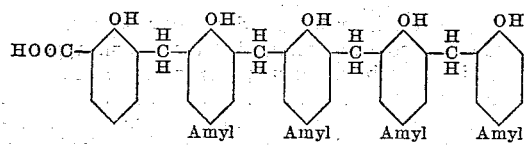

The above formula is, of course, an idealized structure, for obvious reasons, because the salicylic acid nucleus presumably can appear at any point in the resin molecule. Such resin, or for that matter, a resin having an increased number of salicylic acid radicals, can be oxyalkylated in the same manner as other phenol-aldehyde resins.

If obtained from 2 moles of salicylic acid and 3 moles of amylphenol the corresponding idealized formula would be thus:

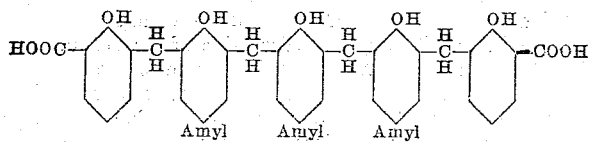

As to the preparation of such resins, purely by way of illustration certain examples are repeated substantially in verbatim form as they appear in said aforementioned U. S. Patent No. 2,571,118. In said patent there is reference to an example which illustrates resinification without use of salicylic acid. For continuity of text this example obviously is included.

*Example 1aa*

| | Grams |
|---|---|
| Para-tertiary butylphenol | 150 |
| Formaldehyde, 37% | 81 |
| Concentrated HCl | 1.5 |
| Monoalkyl (C10-C20, principally C12-C14 benzene monosulfonic acid sodium salt) | 0.8 |
| Xylene | 100 |

Examples of alkylaryl acids which serve as catalysts and as emulsifiers particularly in the form of sodium salts, include the following

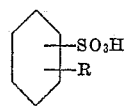

R is an alkyl hydrocarbon radical having 12–14 carbon atoms.

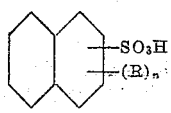

R is an alkyl radical having 3–12 carbon atoms and $n$ represents the numeral 3, 2, or 1, usually 2, in such instances where R contains less than 8 carbon atoms.

With respect to alkylaryl sulfonic acids or the sodium salts, I have employed a monoalkylated benzene monosulfonic acid or the sodium salt thereof, wherein the alkyl group contains 10 to 14 carbon atoms. I have found equally effective and interchangeable the following specific sulfonic acids, or their sodium salts. A mixture of di- and tripropylated naphthalene monosulfonic acid; diamylated naphthalene monosulfonic acids; and nonyl naphthalene monosulfonic acid.

The equipment used was a conventional two-piece laboratory resin pot. The cover part of the equipment had four openings; one for reflux condenser, one for the stirring device; one for a separatory funnel or other means of adding reactants; and a thermometer well. In the manipulation employed the separatory funnel insert for adding reactants was not used. The device was equipped with a combination reflux and water-trap apparatus, so that the single piece of equipment could be used as either a reflux condenser or a water trap, depending upon the position of the three-way glass stop-cocks. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

The phenol, formaldehyde, acid catalyst, and solvent were combined in the resin pot, above described. This particular phenol was in the form of a flaked solid. Heat was applied, with gentle stirring, and the temperature was raised to 80–85° C., at which point a mild exothermic reaction took place. This reaction raised the temperature to approximately 105–110° C. The reaction mixture was then permitted to reflux at 100–105° C. for between one and one-and-one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. I have removed also the solvent by conventional means, such as evaporation, distillation, or vacuum distillation, and I customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol in presence of a strong mineral acid as a catalyst and using formaldehyde, sometimes yields a resin which apparently has a very slight amount of cross-linking. Such resin is similar to the one described above, except that it is sometimes opaque, and its melting point is higher than the one described above and there is a tendency to cure. Such a resin generally is dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If, in following a given procedure with a given lot of the phenol, such a resin is obtained, the amount of catalyst employed is advantageously reduced slightly, or the time of reflux reduced slightly, or both, or an acid such as oxalic acid is used instead of hydrochloric acid. Purely as a matter of convenience due to better solubility in xylene, I prefer to use a clear resin, but if desired, either type may be employed. (See Example 1a of aforementioned Patent No. 2,571,118.)

*Example 2aa*

| | | |
|---|---|---|
| Para-tertiary nonylphenol (3.0 moles) | grams | 660 |
| Salicylic acid (2.0 moles) | do | 276 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours, instead of 1½ hours. Also, note the marked increase in amount of acid used as a catalyst in this instance.

The resin solution so obtained contained approximately 41.2% xylene.

The solvent-free resin was pale reddish amber in color, xylene-soluble, clear, and quite soft in consistency. (See Example 18a of aforementioned Patent 2,571,118.)

*Example 3aa*

| | | |
|---|---|---|
| Para-tertiary amylphenol (4.0 moles) | grams | 656 |
| Salicylic acid (1.0 mole) | do | 138 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours, instead of 1½ hours. Also, note the marked increase in amount of acid used as a catalyst in this instance.

The resin solution so obtained, contained approximately 45% xylene. The solvent-free resin was reddish amber in color, slightly opaque, obviously xylene-soluble, and somewhat hard to pliable in consistency. (See Example 7a of aforementioned Patent 2,571,118.)

*Example 4aa*

| | | |
|---|---|---|
| Para-tertiary amylphenol (3.0 moles) | grams | 492 |
| Salicylic acid (2.0 moles) | do | 276 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours, instead of 1½ hours. Also, note the marked increase in amount of acid used as a catalyst in this instance.

The resin solution so obtained contained approximately 48.8% xylene. The solvent-free resin was reddish amber in color, clear, xylene-soluble and semi-soft or pliable in consistency. (See Example 13a of aforementioned Patent 2,571,118.)

*Example 5aa*

| | | |
|---|---|---|
| Para-secondary butylphenol (3.0 moles) | grams | 450 |
| Salicylic acid (2.0 moles) | do | 276 |
| Formaldehyde 37% (5.0 moles) | do | 405 |
| HCl (concentrated) | ml | 40 |
| Xylene | grams | 700 |
| Dodecyl toluene monosulfonic acid sodium salt | grams | 3 |

The same procedure was followed as in Example 1aa, preceding, except that the reflux period was 5 hours, instead of 1½ hours. Also, note the marked increase in amount of acid used as a catalyst in this instance.

The resin solution, so obtained, contained approximately 44.2% xylene. The solvent-free resin was amber in color, slightly opaque, almost entirely soluble in xylene, and fairly hard or pliable in consistency. (See Example 14a of aforementioned Patent 2,571,118.)

*Example 6aa*

| | | |
|---|---|---|
| Para-octylphenol (3.0 moles) | grams | 618 |
| Salicylic acid (2.0 moles) | do | 276 |
| Formaldehyde 37% | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours instead of 1½ hours. Also, note the marked increase in amount of acid used as a catalyst in this instance.

The resin solution, so obtained, contained approximately 42.3% xylene. The solvent-free resin was clear, reddish amber in color, xylene-soluble, and semi-hard to pliable in consistency. (See Example 16a of aforementioned Patent 2,571,118.)

*Example 7aa*

| | Grams |
|---|---|
| Para-tertiary amylphenol (4.0 moles) | 656 |
| Salicylic acid (1.0 mole) | 138 |
| Propionaldehyde (5.0 moles) | 305 |
| Xylene | 700 |
| Concentrated sulfuric acid | 20 |

Whenever propionaldehyde or similar aldehydes were employed the procedure was changed slightly from that employed in Example 1aa. The equipment employed, however, was the same. The amylphenol, salicylic acid, xylene and acid catalyst were combined in the resin pot, stirred and heated to 150° C. At this point the propionaldehyde was added slowly for about 1½ hours, after which the whole reaction mass was permitted to reflux for 5 hours at the reflux temperature of water or slightly above, i. e., 100°–110° C., before distilling out water. The amount of water distilled out was 102 cc.

The resin solution so obtained contained approximately 41.2% xylene. The solvent-free resin was reddish-black, clear, xylene-soluble and hard but not brittle in consistency.

(See Example 19a of aforementioned U. S. Patent No. 2,571,118.)

PART 3

This part is concerned with the preparation of phenol-aldehyde resins of the kind described in detail in U. S. Patent No. 2,499,370, dated March 7, 1950, to De Groote and Keiser, with the following qualifications; said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. Patents: Nos. 2,499,365, 2,499,366, and 2,499,367, all dated March 7, 1950, to De Groote and Keiser. These patents, along with the other two previously mentioned patents, describe phenolic resin of the kind herein employed as initial materials.

For practical purposes, the resins having 4 to 12 carbon atoms are most satisfactory, with the additional $C_{14}$ carbon atoms also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71a.

Reference has been made to an earlier formula which was in essence an over-simplification representing a phenolformaldehyde resin. Actually, some other aldehyde, such as acetaldehyde, propionaldehyde, or butyraldehyde, may be used. The resin unit can be exemplified thus:

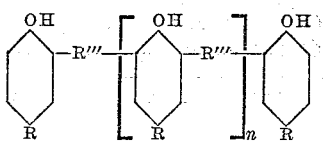

in which $R'''$ is the divalent radical obtained from the particular aldehyde employed to form the resin.

As previously stated, the preparation of resins of the kind herein employed as reactants is well known. See U. S. Patent No. 2,499,368, dated March 7, 1950, to De Groote and Keiser. Resins can be made using an acid catalyst or basic catalyst or a catalyst showing neither acid nor basic properties in the ordinary sense, or without any catalyst at all. It is preferable that the resins employed be substantially neutral. In other words, if prepared by using a strong acid as a catalyst, such strong acid should be neutralized. Similarly, if a strong base is used as a catalyst, such strong acid should be neutralized. Similarly, if a strong base is used as a catalyst it is preferable that the base be neutralized although we have found that sometimes the reaction described proceeded more rapidly in the presence of a small amount of free base. The amount may be as small as a 200th of a percent and as much as a few 100ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purpose of convenience suitable resins are characterized in the following table:

TABLE I

| Example number | R | Position of R | R''' derived from— | n | Mol. wt. of resin molecule (based on n+2) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 4

As noted previously, a variety of secondary amines free from a primary amino group may be employed. These amines fall into five categories, as indicated previously.

One category consists of strongly basic secondary monoamines free from hydroxyl groups whose composition may be indicated thus:

in which $R'$ represents a monovalent alkyl, alicyclic, aryl-alkyl radical and may be heterocyclic in a few instances as in the case of piperidine and a secondary amine derived from furfurylamine by methylation or ethylation, or a similar procedure.

Another example of a heterocyclic amine is, of course, morpholine.

The secondary amines most readily available are, of course, amines such as dimethylamine, methylethylamine, diethylamine, dipropylamine, ethylpropylamine, dibutylamine, diamylamine, dihexylamine, dioctylamine, and dinonylamine. Other amines include bis(1,3-dimethylbutyl)amine. There are, of course, a variety of primary amines which can be reacted with an alkylating agent such as dimethyl sulfate, diethyl sulfate, an alkyl bromide, an ester of sulfonic acid, etc., to produce suitable amines within the herein specified limitations. For example, one can methylate alpha-methylbenzylamine, or benzylamine itself, to produce a suitable reactant. Needless to say, one can use secondary amines such as dicyclohexylamine, dibutylamine or amines containing one cyclohexyl group and one alkyl group, or one benzyl group and one alkyl group, such as ethylcyclohexylamine, ethylbenzylamine, etc.

Other suitable compounds are exemplified by $(C_2H_5OC_2H_4OC_2H_4)_2NH$ $(C_8H_{17}OC_2H_4OC_2H_4OC_2H_4)_2NH$ $(C_4H_9OCH_2CH(CH_3)O(CH_3)CHCH_2)_2NH$ $(CH_3OCH_2CH_2OCH_2CH_2OCH_2CH_2)_2NH$ $(CH_3OCH_2CH_2CH_2CH_2CH_2CH_2)_2NH$ Other somewhat similar secondary amines are those of the composition

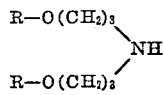

as described in U. S. Patent No. 2,375,659, dated May 8, 1945, to Jones et al. In the above formula R may be methyl, ethyl, propyl, amyl, octyl, etc.

Other amines can be obtained from products which are sold in the open market, such as may be obtained by alkylation of cyclohexylmethylamine or the alkylation of similar primary amines, or, for that matter, amines of the kind described in U. S. Patent No. 2,482,546, dated September 20, 1949, to Kaszuba, provided there is no negative group or halogen attached to the phenolic nucleus. Examples include the following: beta-phenoxyethylamine, gamma-phenoxypropylamine, beta-phenoxy-alpha-methylethylamine, and betaphenoxypropylamine.

Other suitable amines are the kind described in British Patent No. 456,517 and may be illustrated by $C_{12}H_{25}-O-CH_2-CH_2-O-CH_2-CH_2-NH-CH_3$ The secondary category represents secondary amines which are hydroxylated monoamines. These may be illustrated by diethanolamine, methylethanolamine, dipropanolamine, dibutanolamine and ethylpropanolamine. Suitable primary amines which can be so converted into secondary amines include butylamine, amylamine, hexylamine, higher molecular weight amines derived from fatty acids, cyclohexylamine, benzylamine, furfurylamine, etc.

Other suitable amines include 2-amino-1-butanol, 2-amino - 2 - methyl-1-propanol, 2-amino-2-methyl,1,3-propanediol, 2-amino-2-ethyl-1,3-propanediol, and tris-(hydroxylmethyl)-aminoethane. Another example of such amines is illustrated by 4-amino-4-methyl-2-pentanol.

Other suitable compounds are the following:

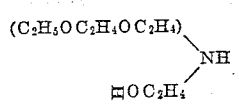

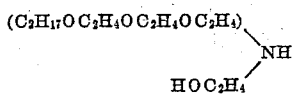

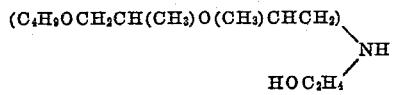

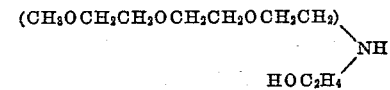

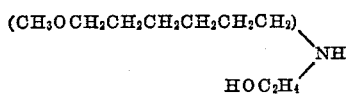

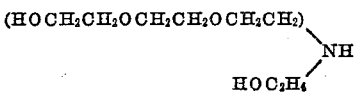

or comparable compounds having two hydroxylated groups of different lengths as in

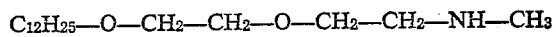

Other examples of suitable amines include alpha-methylbenzylamine and monoethanolamine; also amines obtained by treating cyclohexylmethylamine with one mole of an oxyalkylating agent as previously described; beta-ethylhexylbutanolamine, diglycerylamine, etc. Another type of amine which is of particular interest because it includes a very definite hydrophile group includes sugar amines such as glucamine, galactamine and fructamine, such as N-hydroxyethylglucamine, N-hydroxyethylgalactamine, and N-hydroxyethylfructamine.

Other suitable amines may be illustrated by

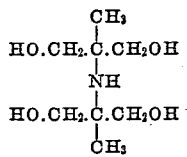

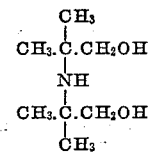

See, also, corresponding hydroxylated amines which can be obtained from rosin or similar raw materials and described in U. S. Patent No. 2,510,063, dated June 6, 1950, to Bried. Still other examples are illustrated by treatment of certain secondary amines, such as the following, with a mole of an oxalkylating agent as described; phenoxyethylamine, phenoxypropylamine, phenoxy-alphamethylethylamine, and phenoxypropylamine.

Polyamines free from a hydroxyl group may be illustrated by the following:

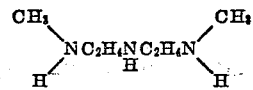

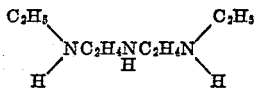

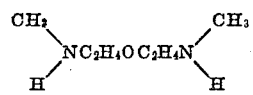

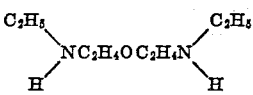

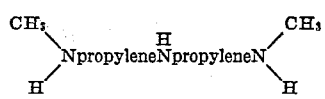

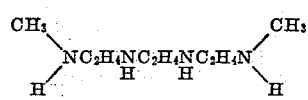

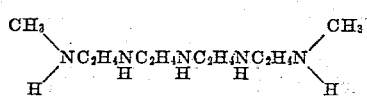

(CH₃)₂NC₂H₄NC₂H₄NC₂H₄NC₂H₄N(CH₃)₂
         H       H       H

The fourth category consists of polyamines having hydroxylated groups which may be characterized by the following:

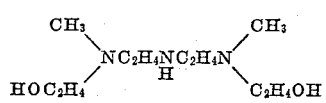

(HOC₂H₄)₂NC₂H₄NC₂H₄N(C₂H₄OH)₂
          H

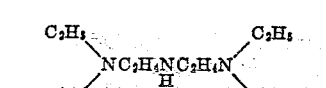

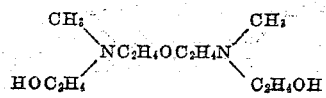

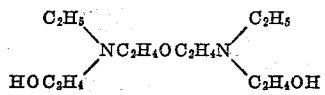

[additional structures follow]

Suitable cyclic amidines which may or may not have a hydroxyl group but are free from primary amino groups may be illustrated by the following:

2-undecylimidazoline
2-heptadecylimidazoline
2-oleylimidazoline
1-N-decylaminoethyl,2-ethylimidazoline
2-methyl,1-hexadecylaminoethylaminoethylimidazoline
1-dodecylaminopropylimidazoline
1-(stearoyloxyethyl)aminoethylimidazoline
1-stearamidoethylaminoethylimidazoline
1-(N-dodecyl)-acetamidoethylaminoethylimidazoline
2-heptadecyl,4,5-dimethylimidazoline
1-dodecylaminohexylimidazoline
1-stearoyloxyethylaminohexylimidazoline
2-heptadecyl,1-methylaminoethyl tetrahydropyrimidine
4-methyl,2-dodecyl,1-methylaminoethylaminoethyl tetrahydropyrimidine A compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as

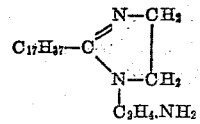

2-heptadecyl,1-aminoethylimidazoline which can be reacted with a single mole of ethylene oxide, for example, to produce the hydroxy ethyl derivative of 2-heptadecyl,1-aminoethylimidazoline, which can be illustrated by the following formula:

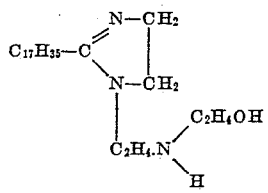

Other reactants may be employed in connection with an initial reactant of the kind described above, to wit, 2-heptadecyl,1-aminoethylimidazoline; for instance, reaction with an alkylene imine such as ethylene imine, propylene imine, etc. If reacted with ethylene imine the net result is to convert a primary amino radical into a secondary amino radical and also introduces a new primary amine group. If ethylene imine is employed, the net result is simply to convert 2-heptadecyl,1-aminoethylimidazoline into 2-heptadecyl,1-diethylenediaminoimidazoline. However, if propylene imine is used the net result is a compound which can be considered as being derived hypothetically from a mixed polyalkylene amine, i. e., one having both ethylene groups and a propylene group between nitrogen atoms.

As has been pointed out previously, the amine employed need only be a basic secondary amine as specified. This means that when condensation is complete there may be residual hydroxyl radicals or amino hydrogen radicals. My preference is to use polyamino compounds in which there are hydroxyl radicals present. The reason for this is simply the fact that when the acylation reaction is attempted I have found that it proceeds with particular ease in respect to the hydroxyl radicals and this is particularly true where there is a preponderance of hydroxyl radicals over residual radicals having an amino hydrogen atom. Simply for sake of brevity in light of the considerable text required in this description, subsequent examples involving acylation have been limited to this preferred type.

PART 5

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

The herein described amine-modified resins are obtained from furfural and not formaldehyde. Due to the greater reactivity of furfural of reasons previously explained as far as I am aware one cannot substitute furfural for formaldehyde in the manufacture of resins of the phenol-amine-aldehyde type. Generally speaking, the objective in the preparation of these amine-modified resins is to obtain a heat-convertible compound even by using formaldehyde. It is not necessary to point out the complications involved when furfural is used. See, for example, U. S. Patent No. 2,031,557 to Bruson. Since the condensation products obtained are not heat-convertible and since temperature up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, I have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethyleneglycol. One can also use a mixture of benzene or xylene and such oxygenated solvents. Note that the use of such oxygenated solvent is not required in the sense that it is not necessary to use an initial resin which is soluble only in an oxygenated solvent as noted, and it is not necessary to have a single phase system for reaction.

In many instances furfural itself has a solvent effect and thus presents less difficulty from the standpoint of reaction containing a formaldehyde which not only is a poor solvent but also usually is used in aqueous form. Furfural, of course, is substantially anhydrous. Of course, water is formed in the condensation reaction. If the solvent is completely removed at the end of the process, no problem is involved if the material is used for any subsequent reaction. However, if the reaction mass is going to be subjected to some further reaction where the solvent may be objectionable as in the case of ethyl or hexyl alcohol, and if there is to be subsequent oxyalkylation, then, obviously, the alcohols should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the products obtained are almost invariably a black or black-red in color. Indeed, the mere use of furfural itself seems to produce at least a type of material that gives the product a darker color and, indeed, considerably darker than comparable products derived from formaldehyde.

By and large, the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble, or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxy-acetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been mentioned previously; (a) is the solvent to remain in the reaction mass without removal? (b) is the reaction mass to be subjected to further reaction in which the solvent, for instance, an alcohol, either low boiling or high boiling, might interfere as in the case of oxyalkylation? and the third factor is this (c) is an effort to be made to purify the reaction mass by the usual procedure as, for example, a water-wash to remove any unreacted low molal soluble amine, if employed and present after the reaction? Such procedures are well known and, needless to say, certain solvents are more suitable than others. Everything else being equal, we have found xylene the most satisfactory solvent.

I have found no advantage in using a low temperature, approximately room temperature, at the start of the reaction although this is sometimes done purely as a matter of convenience. Indeed, using furfural I have usually done nothing more than prepare the reaction mixture, add a suitable amount of xylene, and reflux for approximately 3 to 6½ hours at temperatures varying, as the case may be, from 135° to 160° C. Where the amine has a comparatively low basicity I have sometimes added a small amount or approximately 1% of sodium methylate.

However, using a xylene-benzene mixture, for instance, approximately 170 parts of benzene and 35 parts of xylene, and a phase-separating trap to eliminate water, I have found that I could employ temperatures between 90° and 100° C., and eliminate the water of condensation by refluxing at this temperature. However, I have found no particular advantage in using this low temperature over and above the high temperature previously noted.

*Example 1b*

The resin employed was the one previously designated as 28a and had a molecular weight of approximately 600. 175 grams of this resin were dissolved in an equal weight of xylene and 61 grams of di-isopropanolamine added. 58 grams of furfural were added and the mixture stirred for about 30 minutes and then the temperature allowed to rise to 140° C., where it was allowed to reflux for 6 hours. During this refluxing period a phase-separating trap was used to remove the water of formation. At the end of this time the reaction was complete and the product was obtained in the form of a xylene solution. A small sample was evaporated to eliminate the xylene. The resultant product was a highly viscous, tacky material, being black in color with a reddish tinge.

Similar products were prepared as indicated in the following table.

TABLE II.—PART I

| Ex. No. | Resin amt., grams | Secondary amine | Amt., grams | Furfural, amt. | Solvent (xylene unless otherwise noted), grams | Time period, hrs. | Max. temp. during reaction, °C. |
|---|---|---|---|---|---|---|---|
| 1b | 175 | Di-isopropanolamine | 61 | 58 | 175 | 6 | 140 |
| 2b | 225 | ...do... | 100 | 72 | 225 | 2 | 150 |
| 3b | 225 | Di-ethanolamine | 79 | 72 | 225 | 1.75 | 150 |
| 4b | 225 | ...do... | 79 | 72 | *55–170 | 2 | 93 |
| 5b | 225 | ...do... | 79 | 72 | *55–170 | 2 | 95 |
| 6b | 225 | ...do... | 131.5 | 128 | *55–170 | 2 | 95 |
| 7b | 225 | Di-isopropanolamine | 174 | 128 | 225 | 1.33 | 125 |
| 8b | 295 | ...do... | 100 | 72 | 295 | 2 | 150 |
| 9b | 225 | Di-ethanolamine | 79 | 72 | 295 | 1.75 | 150 |
| 10b | 280 | Di-isopropanolamine | 100 | 72 | 280 | 2 | 150 |
| 11b | 280 | Di-ethanolamine | 79 | 72 | 280 | 1.75 | 150 |

NOTE.—In the above examples no catalyst was added. In some duplications of the above small amounts of catalyst were added up to 1% to 2% of either powdered caustic soda or powdered sodium methylate. No advantage was noted in the use of a catalyst provided the amine was sufficiently basic.

In Examples 4b, 5b, and 6b indicated by the asterisk the solvent was a mixture of 170 parts of benzene and 55 parts of xylene.

The molal ratio of resin to amine to aldehyde was 1 to 2 to 2, except in Examples 6b and 7b where the ratio was 1 to 3.5 to 3.5 in both instances.

In Examples 1b though 7b the resin employed was the one identified as Example 28a. In Examples 8b and 9b the resin employed was the one identified as Example 32a, and in Examples 10b and 11b the resin employed was identified as Example 39a.

TABLE II.—PART II

| Resin No. | Resin used | Amt., grs. | Amine used and amount | Furfural, amt., g. | Solvent xylene and amt., g. | Reaction temp., °C. | Reaction time, hrs. | Max. distill temp., °C. |
|---|---|---|---|---|---|---|---|---|
| 12b | 2a | 882 | Amine A, 296 g | 192 | 500 | 21–24 | 23 | 150 |
| 13b | 5a | 480 | Amine A, 148 g | 96 | 480 | 20–24 | 27 | 155 |
| 14b | 10a | 633 | ...do... | 96 | 620 | 23–27 | 24 | 144 |
| 15b | 2a | 441 | Amine B, 176 g | 96 | 300 | 26–27 | 28 | 145 |
| 16b | 5a | 480 | ...do... | 96 | 425 | 23–28 | 33 | 152 |
| 17b | 10a | 633 | ...do... | 96 | 520 | 21–22 | 30 | 150 |
| 18b | 2a | 882 | Amine C, 324 g | 192 | 625 | 22–25 | 37 | 141 |
| 19b | 5a | 480 | Amine C, 162 g | 96 | 315 | 20–26 | 24 | 145 |
| 20b | 10a | 633 | ...do... | 96 | 545 | 20–22 | 25 | 140 |
| 21b | 13a | 473 | Amine D, 256 g | 96 | 425 | 21–26 | 23 | 146 |
| 22b | 14a | 511 | ...do... | 96 | 450 | 22–25 | 25 | 156 |
| 23b | 15a | 665 | ...do... | 96 | 550 | 24–28 | 27 | 155 |
| 24b | 2a | 441 | Amine E, 208 g | 96 | 400 | 25–29 | 25 | 142 |
| 25b | 5a | 480 | ...do... | 96 | 400 | 20–22 | 27 | 146 |
| 26b | 9a | 595 | ...do... | 96 | 510 | 23–27 | 26 | 140 |
| 27b | 2a | 441 | Amine F, 236 g | 96 | 400 | 22–24 | 33 | 154 |

As to the formulas of the above amines referred to as Amine A through Amine F, inclusive, see immediately following:

Amine A—

$$\begin{array}{c}HOC_2H_4\\ \phantom{HOC_2H_4}\diagdown\\ \phantom{HOC_2H_4}NC_2H_4N\\ \phantom{HOC_2H_4}\diagup\phantom{NC_2H_4N}\diagdown\\ H\phantom{OC_2H_4NC_2H_4N}H\end{array}\quad\begin{array}{c}C_2H_4OH\\ \diagup\\ \phantom{N}\\ \phantom{N}\end{array}$$

Amine B—

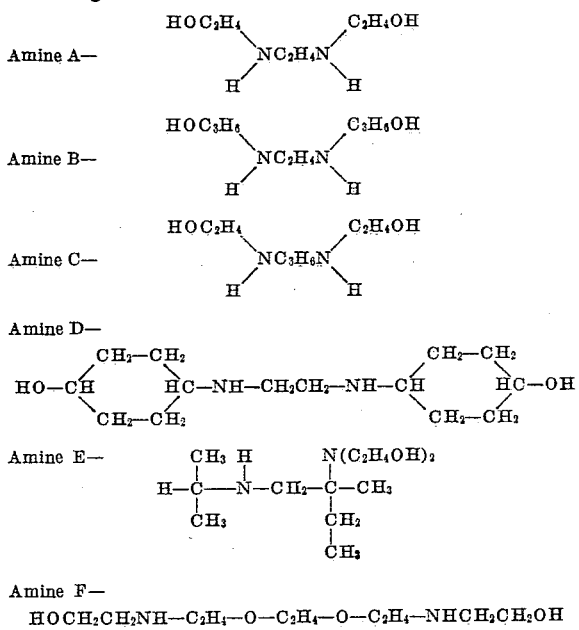

Amine E—

$$\begin{array}{ccc}CH_3 & H & N(C_2H_4OH)_2\\ | & | & |\\ H-C-\!\!-N-CH_2-C-CH_3\\ | & & |\\ CH_3 & & CH_2\\ & & |\\ & & CH_3\end{array}$$

Amine F—

HOCH₂CH₂NH—C₂H₄—O—C₂H₄—O—C₂H₄—NHCH₂CH₂OH

In the examples which appear in the second part of the table immediately preceding, no catalyst was added for the additional reason that the polyamino compound had more than one basic nitrogen radical as compared with the monoamino compounds described in Part 1.

In some instances the examples were repeated using one-half to one-and-a-half percent powdered caustic soda or powdered sodium methylate. Here, again, no advantage was noted in the addition of the caustic.

PART 6

Needless to say, the two prior reactants can be combined readily by means of an acylation reaction, i. e., either amidification or esterification. Assuming there is no residual amino hydrogen atom present in the particular reactant selected and described in Part 4, obviously acylation is limited to esterification. Assuming that there is a residual amino hydrogen atom present amidification probably takes place preferentially and under other circumstances both amidification and esterification can take place.

It has been pointed out that the amine-modified condensate under any conditions must have at least two alkanol hydroxyl groups and may have more, for instance, 3, 4, 5, or 6.

It is to be noted the carboxylated resins may be monofunctional, difunctional or even may contain 3 or more carboxyls. For practical purposes the preferred resin contains one or two carboxyl groups. A carboxylated resin having one carboxyl group may be reacted with a suitable amine-modified resin so as to combine only one such carboxylated resin molecule. Similarly, the amine-modified resin molecule may combine with at least two such monocarboxylated resin molecules. In some instances as, for example, when derived from diethanolamine or dipropanolamine the amine-modified resin may be combined with as many as 4 or perhaps as many as 6 monocarboxylated resin units.

When the carboxylated resin contains more than one carboxyl group, for instance, two carboxyl groups, the same combination as above indicated may take place but in addition there may be formed linear polymers and also polymers showing cross-linking, at least to some modest degree. Modest cross-linking is not objectionable provided the resultant product is still soluble in an organic solvent and is thermoplastic. The objective is to obtain a product which, regardless of its other uses is readily susceptible to oxyalkylation. Thus, soluble complicated resins have been obtained using dicarboxylated resins and compounds obtained from dialkanolamines in which structure other than linear polymer structure appears.

The reaction involving the carboxylated resin is acylation, broadly speaking, and essentially esterification but amidification may be involved. For practical purposes the simplest phase of the reaction may be illustrated by the reactions described in my co-pending application, Serial No. 388,051, filed October 23, 1953. In this instance the reaction between the carboxylated resins and amine-modified phenol-aldehyde resins is concerned with those in which the ratio of resin molecule to amine molecule to formaldehyde is 1:2:2.

In two co-pending applications, Serial Nos. 388,051 and 388,052, filed October 23, 1953, where the simpler condensate is described particularly in reaction with a carboxylated resin it is obvious that acylation is limited to esterification. What was said therein is as follows:

Returning to the over-simplified presentation of the amine-modified resin and particularly one obtained from diethanolamine, for example, or for that matter from ethylethanolamine, the product would be illustrated thus:

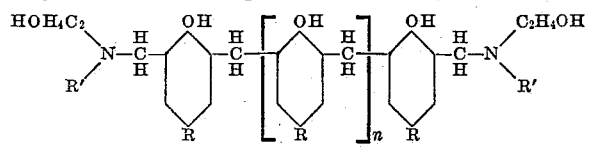

in which R' is alkyl or alkanol.

There has been presented earlier an idealized formula for the carboxylated resin. The terminal part of the molecule may be shown thus

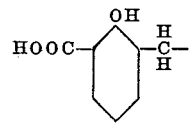

Since the hydroxylated polyamines may or may not contain two amino hydrogen atoms or even more as exemplified by the following three reactants:

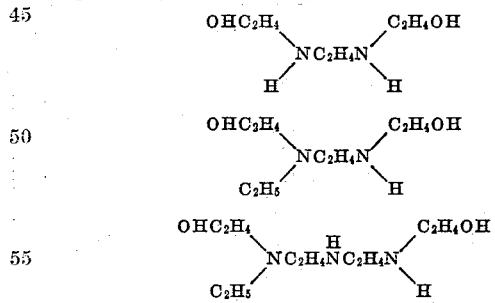

it becomes obvious esterification may enter into the reaction, or amidification when combination takes place with the carboxylated resin. Amidification and esterification may both be involved if the reactant is comparable to the third polyamine above illustrated. The cheapest hydroxylated amine available in the market is the first of the three compounds depicted above.

Without attempting to include all the ramifications and particularly where the amine radical is hydroxylated and there is no amino hydrogen left after condensation as in the second of the above formulas just presented, the esterification reaction with the formation of an ester linkage may be shown thus:

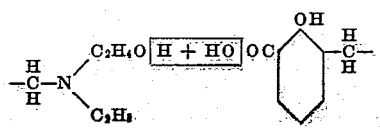

It goes without saying that esterification may involve the ethanol group attached to nitrogen which, in turn, is attached to an ethylene bridge. It does not appear necessary to illustrate amidification or the formation of esteramides for reason that the analogous reactions will be obvious.

The compounds can be prepared without the use of any solvent although for obvious reasons it is preferable that a solvent be used. Indeed, it is specified that the resins employed be xylene-soluble. In every instance xylene was used as a solvent but obviously any other comparable solvent such as ethylbenzene, cymene, or the like, can be employed. However, xylene seems to be very suitable.

The general procedure was to dissolve the carboxylated resin in xylene as indicated and then add the amine-modified resin using a reflux condenser with a phase-separating trap. The reaction was conducted for a period of time at a comparatively low temperature, for instance somewhere above the boiling point of water, and then gradually was taken to a higher temperature, for instance somewhere above the boiling point of water, and then gradually was taken to a higher temperature, for instance, 140° C. to 150° C. There were two reasons for this procedure. An effort was made to limit the reaction as far as possible to the acylation (esterification) and to avoid more complicated reactions such as possible ring formation and the like. Secondly, the effort was made in all instances to avoid gelation or cross-linking so as to yield an insoluble product. If the resultant of reaction became thick and showed incipient cross-linking the reaction was stopped provided the theoretical amount of water, or approximately the theoretical amount, had been eliminated. If there happened to be no danger of cross-linking or ring formation in light of the particular reactants selected, any suitable temperature could be employed.

Water of reaction as formed was eliminated by means of the phase-separating trap and if required the xylene or other solvent employed was eliminated so as to raise the temperature sufficiently high to eliminate the theoretical water of esterification or approximately this amount.

It is not necessary that esterification eliminate all carboxyl radicals or all hydroxyl radicals. Thus, in the use of a carboxylated resin having 2 or more carboxyl radicals if desired the reaction may be conducted so that only one carboxyl radical is reacted. Thus, the residual product may have a free carboxyl radical, or a free carboxyl radical and a free hydroxyl radical. In such instances where all the carboxyl radicals are esterified there may be free hydroxyl radicals, or even where only one carboxyl group is reacted.

The entire procedure is conventional and, in fact, has been described in the formation of other esters or amides of acylated products using carboxylated resins.

Example 1f

The carboxylated resin employed was 4aa. The amine-modified resin employed was 1b. The molecular weight of carboxylated resin 4aa was 846. A gram mole of the resin, to wit, 846 grams, were reacted with 962 grams (one mole) of the amine-modified resin (xylene-free basis). The amount of xylene present both as a solvent for the two reactants and as added solvent was 800 grams. The mixture started to reflux at about 110° C. and rose rapidly to about 125° C. Xylene was then withdrawn until a temperature of about 160° C. was reached. The mixture was allowed to reflux at this temperature for approximately 5.5 hours during which time period 18 grams of water were eliminated. The reaction was stopped and the xylene which had been withdrawn during the reflux period was returned to the reaction mass.

This example and other examples are presented in Table III following.

TABLE III

| Ex. No. | Carboxylated resin Ex. No. | Mol. ratio | Mol. wt. | Amt. used, grams | Amine modified resin | Wt. of amine modified resin (xylene-free basis), grams | Solvent (xylene) at start, grams | Time, hrs. | Max. temp., °C. | Water out, ml. |
|---|---|---|---|---|---|---|---|---|---|---|
| 1c | 4aa | 1:1 | 846 | 846 | 1b | 962 | 800 | 5.5 | 160 | 18 |
| 2c | 4aa | 1:2 | 846 | 846 | 1b | 1,924 | 1,350 | 5.5 | 165 | 36 |
| 3c | 4aa | 1:1 | 846 | 846 | 2b | 1,018 | 750 | 6.0 | 158 | 18 |
| 4c | 4aa | 1:2 | 846 | 846 | 2b | 2,036 | 1,400 | 5.0 | 172 | 36 |
| 5c | 3aa | 1:1 | 872 | 872 | 1b | 962 | 700 | 6.5 | 170 | 18 |
| 6c | 6aa | 1:1 | 972 | 972 | 2b | 1,018 | 650 | 6.0 | 163 | 18 |
| 7c | 2aa | 1:2 | 1,014 | 1,014 | 1b | 1,924 | 1,475 | 8.0 | 165 | 36 |
| 8c | 2aa | 1:2 | 1,014 | 1,014 | 2b | 2,036 | 1,535 | 7.5 | 163 | 36 |
| 9c | 2aa | 1:2 | 1,014 | 1,014 | 18b | 2,176 | 1,550 | 8.5 | 159 | 36 |
| 10c | 4aa | 1:1 | 846 | 846 | 1b | 962 | 700 | 9.5 | 174 | 36 |
| 11c | 4aa | 1:1 | 846 | 846 | 1b | 1,018 | 800 | 9.5 | 166 | 36 |
| 12c | 4aa | 1:1 | 846 | 846 | 12b | 1,334 | 1,130 | 5.5 | 160 | 18 |
| 13c | 4aa | 1:1 | 846 | 846 | 12b | 2,534 | 2,110 | 6.5 | 157 | 36 |
| 14c | 4aa | 1:1 | 846 | 846 | 13b | 1,412 | 1,120 | 5.5 | 162 | 18 |
| 15c | 4aa | 1:2 | 846 | 846 | 13b | 1,690 | 2,130 | 5.0 | 170 | 36 |
| 16c | 4aa | 1:1 | 846 | 846 | 14b | 1,717 | 1,365 | 5.0 | 168 | 18 |
| 17c | 4aa | 1:2 | 846 | 846 | 14b | 3,309 | 1,370 | 6.5 | 160 | 36 |
| 18c | 4aa | 1:1 | 846 | 846 | 15b | 1,388 | 1,165 | 8.5 | 168 | 18 |
| 19c | 4aa | 1:2 | 846 | 846 | 15b | 2,650 | 2,135 | 6.5 | 175 | 36 |
| 20c | 4aa | 1:1 | 846 | 846 | 16b | 1,468 | 1,210 | 8.5 | 168 | 18 |
| 21c | 4aa | 1:2 | 846 | 846 | 16b | 1,804 | 2,240 | 6.0 | 169 | 36 |
| 22c | 3aa | 1:1 | 872 | 872 | 17b | 1,468 | 1,110 | 7.0 | 160 | 18 |
| 23c | 3aa | 1:1 | 872 | 872 | 17b | 1,773 | 1,420 | 5.0 | 161 | 18 |
| 24c | 3aa | 1:1 | 872 | 872 | 12b | 1,332 | 1,130 | 5.0 | 173 | 18 |
| 25c | 6aa | 1:1 | 972 | 972 | 13b | 1,412 | 1,150 | 4.5 | 168 | 18 |
| 26c | 6aa | 1:1 | 972 | 972 | 14b | 1,717 | 1,395 | 6.5 | 166 | 18 |
| 27c | 6aa | 1:1 | 972 | 972 | 16b | 1,468 | 1,235 | 6.0 | 157 | 18 |
| 28c | 2aa | 1:2 | 1,014 | 1,014 | 12b | 2,534 | 1,115 | 6.0 | 161 | 36 |
| 29c | 2aa | 1:2 | 1,014 | 1,014 | 13b | 2,644 | 2,230 | 7.5 | 170 | 36 |
| 30c | 2aa | 1:2 | 1,014 | 1,014 | 14b | 3,309 | 2,425 | 6.5 | 171 | 36 |
| 31c | 4aa | 1:1 | 846 | 846 | 12b | 1,334 | 1,140 | 8.5 | 176 | 36 |
| 32c | 4aa | 1:1 | 846 | 846 | 13b | 1,115 | 1,125 | 9.0 | 162 | 36 |
| 33c | 4aa | 1:1 | 846 | 846 | 14b | 1,722 | 1,880 | 10.0 | 156 | 36 |
| 34c | 4aa | 1:1 | 846 | 846 | 15b | 1,388 | 1,125 | 12.0 | 167 | 36 |
| 35c | 4aa | 1:1 | 846 | 846 | 16b | 1,468 | 1,155 | 11.0 | 156 | 36 |
| 36c | 4aa | 1:1 | 846 | 846 | 17b | 1,773 | 1,445 | 11.0 | 169 | 36 |

Note that in the last six examples a mole of dicarboxylated resin was reacted mole-for-mole with a polyhydroxylated amine-modified resin. The reaction was continued in an effort to produce a linear polymer, to wit, to esterify both carboxyls of the carboxylated resin. The reaction probably ended with free hydroxyl groups and perhaps a structure more complicated, at least to some degree than a simple linear polymer. Note the ratio for example of reactants in 20c is identical with that in 1c but in 20c the amount of water eliminated was approximately 36 grams as compared with 18 grams in 1c.

PART 7

The products obtained as described may be used for various purposes in which surface-active agents may be employed. When combined with acids such as hydroxy acid, lactic acid, gluconic acid, or the like, the salts show increased hydrophile properties. When combined with higher fatty acids, high molal monosulfonic acids such as mahogany acids, the products show increased hydrophobe effect. These compounds as such, or in salt form may be employed as additives to demulsifying agents.

The products are particularly valuable as additives for demulsifying agents employed in conjunction with concentrated hydrochloric acid. They may be used as corrosion inhibitors or rust preventives, particularly in combination with chromium compounds as described in U. S. Patent No. 2,450,807, dated October 5, 1948, to McCarthy.

They may be used as anti-stripping agents in connection with asphalt.

In some instances they are effective for the resolution of petroleum emulsions of the oil-in-water type.

The most important use, however, as far as I am aware, is as an intermediate.

The above products can be subjected to oxyalkylation, particularly with an alkylene oxide having not over 4 carbon atoms such as ethylene oxide, butylene oxide, propylene oxide, glycide, methylglycide, etc., to produce a variety of materials, some of which are extremely hydrophile, others which show hydrophile-hydrophobe balance, particularly if ethylene oxide is used in combination with butylene oxide or propylene oxide. The compounds so obtained are extremely useful for the resolution of petroleum emulsions of the water-in-oil type. All that is required is to follow the procedure set forth in U. S. Patent No. 2,636,038, dated April 21, 1953, to Brandner.

The compounds herein described can be reacted with diepoxides so as to form a more complex molecule and then reacted with monoepoxides as above described to give additional products useful for various purposes and particularly the resolution of petroleum emulsions of the water-in-oil type.

Having thus described my invention what I claim as new and desire to secure by Letters Patent is:

1. An acylation process comprising reacting (A) a carboxylated phenol-aldehyde resin, and (B) an amine-modified phenol-aldehyde resin in a molar ratio of amine-modified resin to carboxylated resin of at least 1 to 1; said carboxylated resin (A) being a fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per resin molecule; said resin being formed in the substantial absence of phenols of functionality greater than two, and said phenol being of the formula

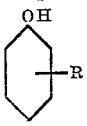

in which R is a hydrocarbon radical having at least 4 and not more than 14 carbon atoms and substituted in one of the positions ortho and para; said amine-modified phenol-aldehyde resin (B) being the product obtained by the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol forming reactivity; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

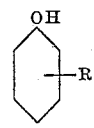

in which R is an aliphatic hydrocarbon radical having at least 4 and not more than 24 carbon atoms and substituted in the 2,4,6 position; (b) a basic secondary amine free from any primary amino radical and having not more than 32 carbon atoms in any group attached to any amino nitrogen radical and reactive toward furfural; and (c) furfural; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; with the final proviso that the product of the acylation reaction be thermoplastic and organic-solvent soluble.

2. The process of claim 1 with the proviso that there be an alkanol radical attached to at least one amino nitrogen atom.

3. An acylation process comprising reacting (A) a carboxylated phenol-aldehyde resin, and (B) an amine-modified phenol-aldehyde resin in a molar ratio of amine-modified resin to carboxylated resin of at least 1 to 1; said carboxylated resin (A) being a fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula

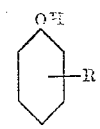

in which R is a hydrocarbon radical having at least 4 and not more than 14 carbon atoms and substituted in one of the positions ortho and para; said amine-modified phenol-aldehyde resin (B) being the product obtained by the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol forming reactivity; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

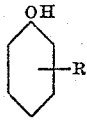

in which R is an aliphatic hydrocarbon radical having at least 4 and not more than 24 carbon atoms and substituted in the 2,4,6 position; (b) a basic hydroxylated secondary monoamine having not more than 32 carbon atoms in any group attached to the amino nitrogen atom and reactive towards furfural; and (c) furfural; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; with the final proviso that the product of the acylation reaction be thermoplastic and organic-solvent soluble.

4. The process of claim 3 with the proviso that the carboxylated resin molecule have approximately 5 phenolic nuclei of which not over 2 are obtained from salicylic acid.

5. The process of claim 3 with the proviso that the carboxylated resin molecule have approximately 5 phenolic nuclei of which 2 are obtained from salicylic acid.

6. The process of claim 3 with the proviso that the carboxylated resin molecule have approximately 5 phenolic nuclei of which 2 are obtained from salicylic acid and with the further proviso that the molal ratio of amine-modified resin to carboxylated resin be 1 to 1.

7. The process of claim 3 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified phenol-aldehyde resin condensate be obtained from a dialkanolamine.

8. The process of claim 3 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified phenol-aldehyde resin condensate be obtained from the dialkanolamine having not over 6 carbon atoms in the alkanol group.

9. The process of claim 3 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of diethanolamine as a reactant.

10. The process of claim 3 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of dipropanolamine as a reactant.

11. The process of claim 3 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of dibutanolamine as a reactant.

12. The process of claim 3 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of dihexanolamine as a reactant.

13. The product obtained by the manufacturing process defined in claim 1.

14. The product obtained by the manufacturing process defined in claim 2.

15. The product obtained by the manufacturing process defined in claim 3.

16. The product obtained by the manufacturing process defined in claim 4.

17. The product obtained by the manufacturing process defined in claim 5.

18. The product obtained by the manufacturing process defined in claim 6.

19. The product obtained by the manufacturing process defined in claim 7.

20. The product obtained by the manufacturing process defined in claim 8.

21. The product obtained by the manufacturing process defined in claim 9.

22. The product obtained by the manufacturing process defined in claim 10.

23. The product obtained by the manufacturing process defined in claim 11.

24. The product obtained by the manufacturing process defined in claim 12.

References Cited in the file of this patent
UNITED STATES PATENTS

| | | |
|---|---|---|
| 2,571,120 | De Groote et al. | Oct. 16, 1951 |
| 2,679,485 | De Groote | May 25, 1954 |